UNITED STATES PATENT OFFICE.

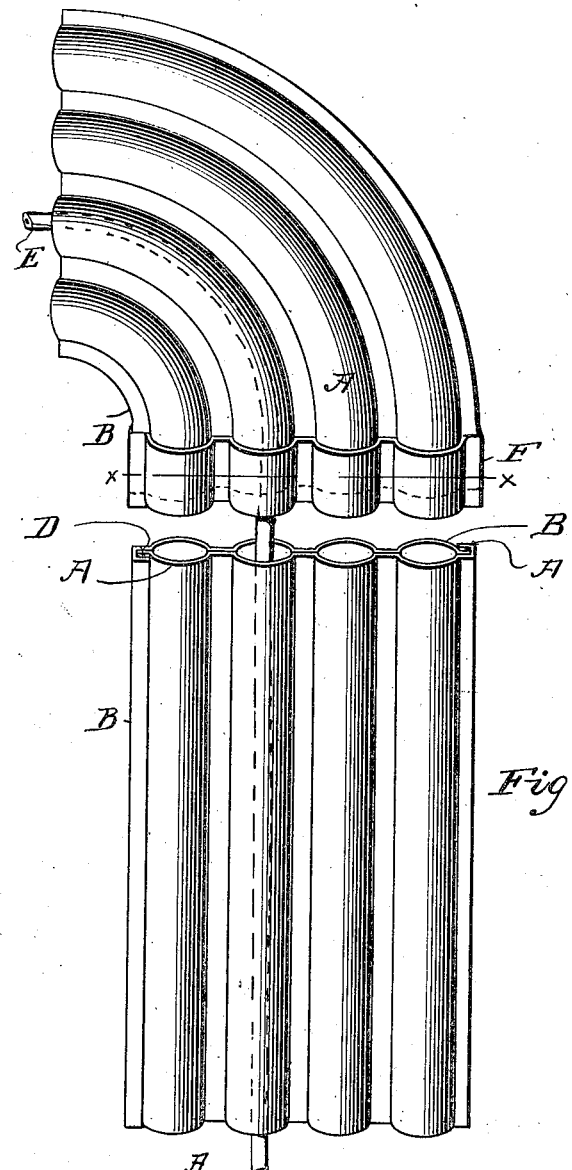

THOMAS E. MURRAY AND ARTHUR V. A. McHARG, OF NEW YORK, N. Y.; SAID McHARG ASSIGNOR TO SAID MURRAY.

MULTIDUCT.

1,149,592. Specification of Letters Patent. Patented Aug. 10, 1915.

Application filed April 30, 1913. Serial No. 764,533.

*To all whom it may concern:*

Be it known that we, THOMAS E. MURRAY and ARTHUR V. A. McHARG, citizens of the United States, residing at New York, in the county of New York and State of New York, have invented a certain new and useful Improvement in Multiducts, of which the following is a specification.

The invention is a multiduct for electrical conductors, consisting of two plates of sheet metal, each having formed in it preferably by stamping or rolling a plurality of parallel longitudinal grooves. The two plates are placed face to face, with the grooves registering to form the conduits, and may be united by doubling over the flat edge of one plate to inclose the edge of the other. The two plates thus united themselves form the whole conduit and are not embedded or reinforced by cement, pitch or similar material.

It is the object of the present invention to simplify and cheapen the multiduct for electrical conductors such as are commonly used underground in cities and placed in tunnels or subways, by eliminating the usual inclosing boxes or envelops of insulating material and by making the entire multiduct one that can be dealt with as easily as a single duct both in leading it from place to place and in connecting it to other and similar ducts.

In the accompanying drawings—Figure 1 is a top view, showing a curved section and a straight section, separated at the joint between them. Fig. 3 is a cross section of strap F. Fig. 2 is a cross section of the multiduct and strap on the line $x$, $x$ of Fig. 1.

Similar letters of reference indicate like parts.

A and B are two plates, either straight or curved, of sheet metal, in each of which are formed a like number of grooves C, which register to form conduits when said plates are placed together. On one side, the edge of plate A overlaps and is bent around the edge of plate B. On the other side, the edge of plate B overlaps and is bent around the edge of plate A. We do not limit ourselves to this construction, since obviously both edges of either plate may, if desired, be bent around the edges of the other plate. Between the bent over edges a packing strip D may be inserted.

In the conduits formed by the registering grooves C electrical conductors may be placed, as shown at E. The multiduct is made in sections of convenient length which are placed end to end and united by a two part strap F which follows the contour of the sections and covers the joint between them. The edges of the parts of the strap overlap, and may be secured by soldering, if desired.

The multiduct thus produced consists of but two plates, which may easily be stamped from sheet metal and so inexpensively produced. It occupies little space, is of minimum weight, and renders unnecessary the use of separate pipes or conduits for the several conductors.

We claim:

1. A multiduct, consisting of two longitudinally corrugated plates of sheet metal face to face with their grooves registering to form conduits, each of said plates having flat portions at its edges, and each plate having one of its edges doubled over to form securing means to hold it to the other plate.

2. A multiduct, consisting of two longitudinally corrugated plates of sheet metal face to face with their grooves registering to form conduits, each of said plates having flat portions at its edges, and each plate having one of its edges doubled over to form securing means to hold it to the other plate, and a strap having interlocking portions constituting a reverse lock from that between the plates.

In testimony whereof we have affixed our signatures in presence of two witnesses.

THOMAS E. MURRAY.
ARTHUR V. A. McHARG.

Witnesses:
GERTRUDE T. PORTER,
MAY T. McGARRY.